(12) United States Patent
von Kaenel

(10) Patent No.: US 7,564,226 B2
(45) Date of Patent: Jul. 21, 2009

(54) RAPID SUPPLY VOLTAGE RAMP USING CHARGED CAPACITOR AND SWITCH

(75) Inventor: Vincent R. von Kaenel, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 380 days.

(21) Appl. No.: 11/173,582

(22) Filed: Jul. 1, 2005

(65) Prior Publication Data

US 2007/0001747 A1    Jan. 4, 2007

(51) Int. Cl.
*G05F 1/00* (2006.01)
(52) U.S. Cl. ................. 323/242; 323/238; 323/282; 323/901
(58) Field of Classification Search ........... 323/274, 323/272, 282; 363/16, 238, 901; 320/140
See application file for complete search history.

(56) References Cited

U.S. PATENT DOCUMENTS

| | | | |
|---|---|---|---|
| 4,697,229 A * | 9/1987 | Davy et al. ............. 363/49 |
| 5,088,017 A | 2/1992 | Yaginuma et al. |
| 5,659,784 A | 8/1997 | Inaba et al. |
| 6,097,109 A * | 8/2000 | Fendt et al. ............. 307/45 |
| 6,396,243 B2 | 5/2002 | Odaohhara |
| 6,567,279 B2 * | 5/2003 | Brkovic ................. 363/17 |
| 6,839,854 B2 | 1/2005 | Nguyen |
| 6,920,575 B2 | 7/2005 | Odaohhara |
| 7,106,031 B2 * | 9/2006 | Hayakawa et al. ....... 323/224 |
| 7,417,877 B2 * | 8/2008 | Leung et al. ............ 363/49 |
| 2002/0135962 A1 * | 9/2002 | Tang ..................... 361/111 |
| 2003/0102845 A1 * | 6/2003 | Aker et al. .............. 320/139 |
| 2006/0108988 A1 * | 5/2006 | McKelvey et al. ........ 323/205 |
| 2006/0132231 A1 * | 6/2006 | Ishii et al. .............. 330/10 |

\* cited by examiner

*Primary Examiner*—Akm E Ullah
*Assistant Examiner*—Arun Williams
(74) *Attorney, Agent, or Firm*—Lawrence J. Merkel; Meyertons, Hood, Kivlin, Kowert & Goetzel, P.C.

(57) ABSTRACT

In one embodiment, an apparatus is provided for a system including an integrated circuit coupled to a node to receive a supply voltage and having bypass capacitors coupled in parallel with the integrated circuit to the node. The apparatus comprises a first capacitor, a switch coupled to the first capacitor, and a voltage source configured to charge the first capacitor. The switch is coupled to receive a control signal that is asserted, during use, if the supply voltage to an integrated circuit is to be increased. The switch is configured to electrically couple the first capacitor to the node in response to an assertion of the control signal. When electrically coupled to the node, the first capacitor supplies charge to the bypass capacitors. A system comprising the apparatus, the node, the integrated circuit, and the bypass capacitors is also contemplated in some embodiments.

20 Claims, 3 Drawing Sheets

$$V_{ddramp} \cong V_{Reg} * \frac{C_{Charge}}{C_{Byp}} \quad \text{(If Ramp\_Fast = 1)}$$

US 7,564,226 B2

RAPID SUPPLY VOLTAGE RAMP USING CHARGED CAPACITOR AND SWITCH

BACKGROUND

1. Field of the Invention

This invention is related to the field of electronic systems and, more particularly, to providing a supply voltage to an integrated circuit in an electronic system.

2. Description of the Related Art

As the number of transistors included on a single integrated circuit "chip" has increased and as the operating frequency of the integrated circuits has increased, the management of power consumed by an integrated circuit has continued to increase in importance. If power consumption is not managed, meeting the thermal requirements of the integrated circuit (e.g. providing components required to adequately cool the integrated circuit during operation to remain within thermal limits of the integrated circuit) may be overly costly or even infeasible. Additionally, in some applications such as battery powered (e.g. portable) devices such as laptops, personal digital assistants (PDAs), mobile phones, etc., managing power consumption in an integrated circuit may be key to providing acceptable battery life.

For those devices that include a processor, or central processing unit (CPU), a common power management technique is to power down the processor if there are no computation requirements for the processor. In the powered-down state, the supply voltage has been deactivated (or "turned off"). However, when the user of the device requires an operation that involves the processor, the response time must be very fast to avoid the appearance of low performance to the user. To support a rapid response to user input from the powered-down state, the processor's supply voltage must rise rapidly (e.g. in the range of 1-10 microseconds) so that the processor can start executing instructions. Increasing the magnitude of the supply voltage (e.g. from ground to the specified voltage magnitude for the processor) is also referred to as "ramping" the supply voltage.

Currently, DC-DC converters are typically used in mobile devices to provide rapid ramp of the supply voltage. The efficiency of DC-DC converters is typically high, but the size and cost of the devices involved in a fast converter is often prohibitive for cost sensitive applications or volume sensitive applications. The ramp time is generally limited by the amount of bypass capacitance required by the CPU to operate and by the size of the transistors used in the switcher of the DC-DC converter. The efficiency of the DC-DC converter depends on the switching losses in the transistor (i.e. the larger the transistor, the higher the loss). To provide a fast ramp time, the converter analog circuits need to have a wide bandwidth and operate at fast switching frequencies, which increases the losses. On top of that, the circuits are typically high order circuits that cause overshoot in the supply voltage. The overshoot can damage the CPU.

SUMMARY

In one embodiment, an apparatus is provided for a system including an integrated circuit coupled to a node to receive a supply voltage and having bypass capacitors coupled in parallel with the integrated circuit to the node. The apparatus comprises a first capacitor, a switch coupled to the first capacitor, and a voltage source configured to charge the first capacitor. The switch is coupled to receive a control signal that is asserted, during use, if the supply voltage to the integrated circuit is to be increased. The switch is configured to electrically couple the first capacitor to the node in response to an assertion of the control signal. When electrically coupled to the node, the first capacitor supplies charge to the bypass capacitors. A system comprising the apparatus, the node, the integrated circuit, and the bypass capacitors is also contemplated in some embodiments.

In another embodiment, a method comprises detecting that a supply voltage to an integrated circuit is to be increased and electrically coupling a first capacitor to a supply voltage node to the integrated circuit responsive to the detecting. One or more bypass capacitors are also coupled to the power supply node in parallel with the integrated circuit, and the capacitor provides charge to the bypass capacitors.

BRIEF DESCRIPTION OF THE DRAWINGS

The following detailed description makes reference to the accompanying drawings, which are now briefly described.

Figures 1, 2:
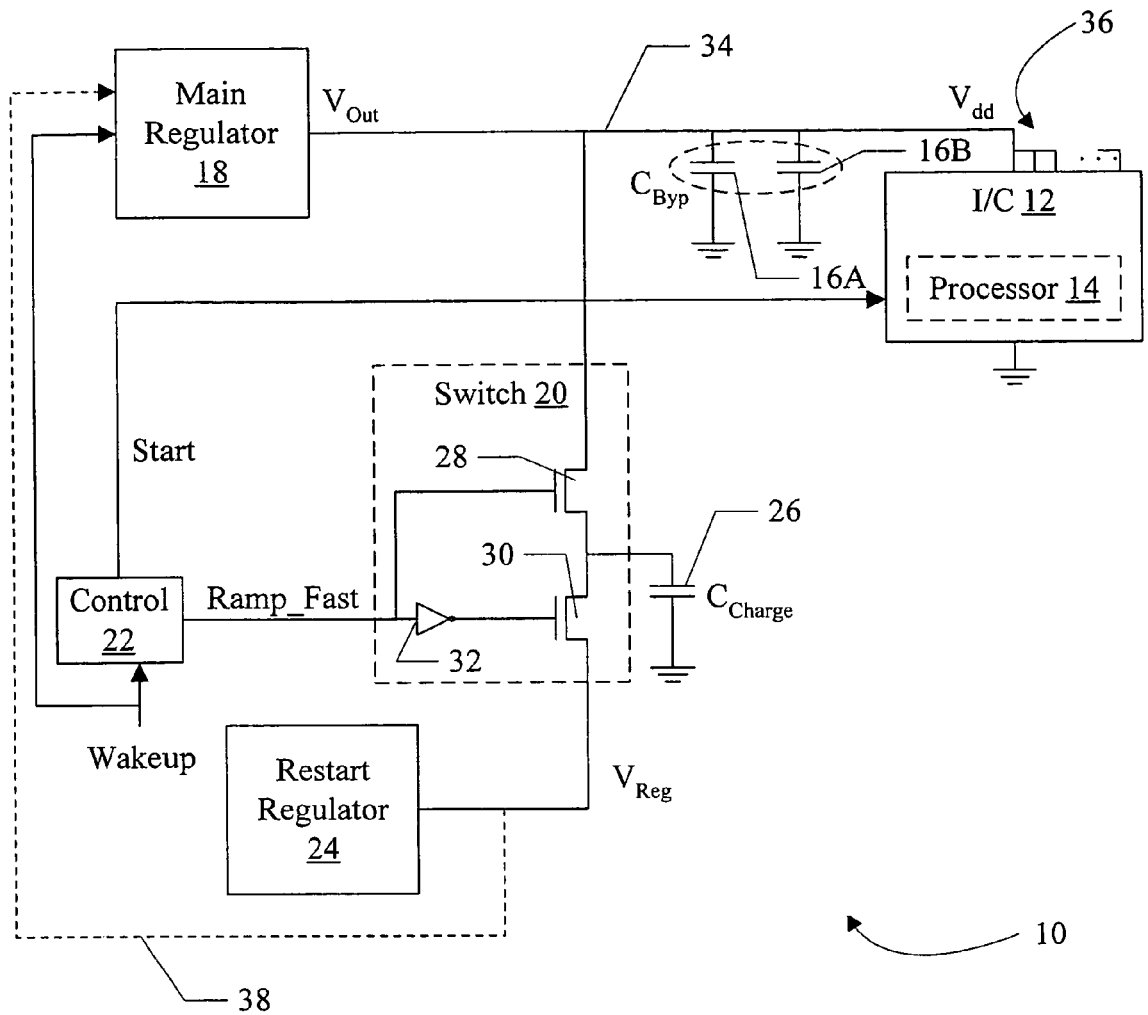
FIG. 1 is a block diagram of one embodiment of a system including an integrated circuit and apparatus to provide a supply voltage to the integrated circuit.
FIG. 2 is a formula for the supply voltage.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of a system 10 is shown. In one embodiment, the system 10 includes an integrated circuit 12 (which includes at least one processor 14, in some embodiments), bypass capacitors such as bypass capacitors 16A-16B, a main voltage regulator 18, a switch 20, a control circuit 22, a restart voltage regulator 24, and a capacitor 26. The integrated circuit 12 is coupled to a supply voltage node 34 that is to be driven to the supply voltage ($V_{dd}$) during normal operation (e.g. a powered-up state). Specifically, the integrated circuit 12 may include one or more input "pins" 36 coupled to the node 34. The pins may be any external conductors that provide connection with the integrated circuit 12. The integrated circuit 12 may also be coupled to ground via other pins (not shown). The bypass capacitors 16A-16B are coupled in parallel with the integrated circuit 12 between the node 34 and ground. The main regulator 18 is also coupled to the node 34. The switch 20 is coupled to the node 34, and is also coupled to the capacitor 26 and to receive a voltage $V_{Reg}$ from the restart regulator 24. The switch 20 is further coupled to receive a control signal (Ramp_Fast in FIG. 1) from the control circuit 22, which is coupled to receive a wakeup signal. The main regulator 18 is coupled to receive the wakeup signal as well. The control circuit 22 is further coupled to provide a start signal to the integrated circuit 12.

In a powered-down state, the main regulator 18 has deactivated the $V_{out}$ output and the voltage on the supply node 34 drains to ground. Circuitry in the system 10 (not shown in FIG. 1) may detect that the integrated circuit 12 is to be restarted (that is, changed from the powered-down state to a powered-up state). For example, in embodiments in which the integrated circuit 12 includes a processor 14, a user input or other system activity may be detected which requires instruction execution by the processor 14. The circuitry may assert the wakeup signal to the control circuit 22 and the main regulator 18.

In response to the wakeup signal, the control circuit 22 may assert the Ramp_Fast signal to the switch 20. In response to the asserted Ramp_Fast signal, the switch 20 electrically couples the capacitor 26 to the node 34. The capacitor 26 has a capacitance $C_{Charge}$, and may be precharged prior to being coupled to the node 34 with a voltage (e.g. $V_{Reg}$, in the illustrated embodiment). When the switch 20 electrically couples the capacitor 26 to the node 34, the capacitor 26 is effectively in parallel with the bypass capacitors 16A-16B, and rapidly provides charge to the bypass capacitors 16A-16B. Accordingly, a rapid ramp of the node 34 from ground to a voltage magnitude referred to herein as $V_{ddramp}$ may be provided. For example, in some implementations, a ramp to the $V_{ddramp}$ may occur on the order of 1 microsecond, although faster or slower ramp times may be supported in other embodiments. Generally, the ramp time may depend on the equivalent series inductance (ESL) and equivalent series resistance (ESR) of the capacitors and the series resistance of the switch 20 (e.g. the series resistance of the transistor 28, for the embodiment of the switch 20 illustrated in FIG. 1). Additionally, the capacitor 26, the bypass capacitors 16A-16B, and the switch 20 may be a first order circuit, and thus the supply voltage may not overshoot the $V_{ddramp}$ voltage. The integrated circuit 12 may thus be protected from excessive supply voltage even though a relatively fast ramp time is supported.

The control circuit 22 may be configured to assert the start signal to the integrated circuit 12 after asserting the Ramp_Fast signal, with enough delay to ensure that the node 34 has been ramped to $V_{ddramp}$. Responsive to the start signal, the integrated circuit 12 may begin operating (e.g. the processor 14 may begin executing instructions). Thus, the integrated circuit 12 may begin operating rapidly. In some embodiments, the integrated circuit 12 may begin operating prior to the main regulator 18 providing the supply voltage on the node 34. The bypass capacitors 16A-16B may supply the voltage until the main regulator 18 outputs the supply voltage. In some embodiments, a regulator that is relatively slow to turn on may be used as the main regulator 18, since the bypass capacitors 16A-16B supply the voltage for rapid wakeup of the integrated circuit 12 (and thus the main regulator 18 may be less expensive then may otherwise required for fast ramp of the supply voltage). For example, a regulator with a turn on time on the order of 100 microseconds may be used, although faster or slower turn times may be implemented in other embodiments.

The capacitance $C_{Charge}$ of the capacitor 26 may be selected dependent on the total bypass capacitance $C_{byp}$ to provide a voltage $V_{ddramp}$ sufficient to ensure that integrated circuit 12 operates correctly. FIG. 2 is an equation 40 that illustrates the approximate value of $V_{ddramp}$ based on the capacitances and the voltage on the capacitor 26 at the time the switch 20 electrically couples the capacitor to the node 34 (e.g. $V_{Reg}$ in the illustrated embodiment). For example, in one embodiment, the integrated circuit 12 may be operable at several operating frequencies. The capacitance of the capacitor 26 may be selected so that the $V_{ddramp}$ voltage exceeds, by a desired margin, the minimum supply voltage specified for the integrated circuit 12 to operate at its lowest operating frequency. The minimum specified supply voltage will be referred to herein as $V_{ddspec}$. The main regulator 18 may subsequently supply $V_{ddspec}$ on the node 34.

By selecting the capacitances so that $V_{ddramp}$ exceeds $V_{ddspec}$ by some margin, the input voltage that charges the capacitor 26 ($V_{Reg}$) need not be carefully regulated, in some embodiments. For example, while the embodiment of FIG. 1 includes the restart regulator 24, other embodiments may have any voltage source for the $V_{Reg}$ voltage used to charge the capacitor 26. The voltage source may limit (or bound) the $V_{Reg}$ voltage, but may not regulate it.

Generally, the switch 20 may comprise any components which electrically couple the capacitor 26 to the node 34 in response to an assertion of the control signal (Ramp_Fast in FIG. 1). The switch 20 may also electrically isolate the capacitor 26 from the node 34 in response to deassertion of the control signal. In some embodiments, the switch 20 may electrically isolate the capacitor 26 from the $V_{Reg}$ voltage source in response to assertion of the control signal and may electrically couple the capacitor 26 to the $V_{Reg}$ voltage source (to charge the capacitor 26) in response to deassertion of the control signal. The series resistance of the switch 20 between the capacitor 26 and the node 34 when electrically coupling the capacitor 26 to the node 34 may be as low as possible to enhance the ramp time for the node 34 to the $V_{ddramp}$ voltage. On the other hand, the series resistance of the switch 20 between the capacitor 26 and the $V_{Reg}$ voltage source, when electrically coupled, may be higher. In some cases, it may be desirable that the series resistance between the capacitor 26 and the $V_{Reg}$ voltage source is higher. For example, if the restart regulator 24 also supplies voltage to other circuitry (e.g. an input voltage to the main regulator 18, illustrated by dotted line 38), having a higher series resistance may reduce the current draw of the capacitor 26 when charging, which may minimize the disturbance of the $V_{Reg}$ voltage when charging the capacitor 26.

In one embodiment, the switch 20 comprises transistors 28 and 30 and an inverter 32. The transistor 20 may have its gate coupled to receive the control signal Ramp_Fast and may be coupled between the capacitor 26 and the node 34. The transistor 30 may be coupled between the capacitor 26 and the $V_{Reg}$ voltage output from the restart regulator 24, and its gate may be coupled to receive the inversion of the control signal Ramp_Fast through the inverter 32.

If the control signal is deasserted, the transistor 28 not actively conducting current and the capacitor 26 is electrically isolated from the node 34. The transistor 30, receiving an inversion of the control signal, is conductive, and the capacitor 26 is charged to the $V_{Reg}$ voltage through the transistor 30. If the control signal is asserted, the transistor 28 is conductive and electrically couples the capacitor 26 to the node 34. The transistor 30 is not actively conducting current, and electrically isolates the capacitor 26 from the $V_{Reg}$ voltage source. In one embodiment, the series resistance of the transistor 28, when conductive, is less than the series resistance of the transistor 30.

In the illustrated embodiment, the transistors 28 and 30 are N-type metal-oxide-semiconductor (NMOS) transistors. In other embodiments, other transistors/transistor-types may be used. For example, P-type MOS (PMOS) transistors may be used as one or both of the transistors 28 and 30. Alternatively, passgates may be used in place of the transistors 28 and/or 30 (in which an NMOS and a PMOS are connected in parallel and the gate of the PMOS is controlled by an inversion of the signal that controls the NMOS or vice versa). In some embodiments, the transistor 30 may not be included and the $V_{Reg}$ voltage source may be coupled directly to the capacitor 26.

The regulators 18 and 24 may be any type of voltage regulator (e.g. switching regulators, linear regulators such as low drop out voltage regulators, series regulators, etc.). In some embodiments, the regulator 24 may provide the input voltage to the regulator 18, as illustrated by dotted line 38. For example, in one implementation, the regulator 24 may receive the input voltage to the system 10 (e.g. a battery input) and may regulate the voltage down to the $V_{Reg}$ voltage. The regulator 18 may regulate the $V_{Reg}$ voltage down to the $V_{dd}$ voltage. In one particular embodiment, the battery input may be 19 volts, the $V_{Reg}$ voltage may be 3.3 volts, and the $V_{dd}$ voltage may be between 0.5 and 1 volt depending on a voltage ID output from the integrated circuit 12.

The bypass capacitors 16A-16B may be provided in close physical proximity to the integrated circuit 12, and may serve to filter voltage variations on the node 34 to help stabilize the $V_{dd}$ supply voltage provided to the integrated circuit 12. Any number of bypass capacitors may be provided in various embodiments.

The integrated circuit 12 may be any type of integrated circuit, implementing any set of desired functions. In the illustrated embodiment, the integrated circuit 12 includes at least one processor 14. For example, the integrated circuit 12 may be a discrete single processor. The integrated circuit 12 may be a chip multiprocessor (CMP) including two or more processors. The integrated circuit 12 may integrate one or more processors and other components in a system on a chip configuration.

The node 34 may comprise any conductive material capable of conducting the supply voltage to the points 36 of the integrated circuit 12 and capable of carrying enough current to supply the current needs of the integrated circuit 12. For example, the node 34 may comprise a conductor, multiple conductors, a plane of conductive material, or combinations thereof.

It is noted that, while the above description refers to ramping the supply voltage on the node 34 from ground to $V_{ddramp}$, other embodiments may ramp the supply voltage from one voltage to another. Generally, a powered-down state may refers to any state in which the power supply voltage is at a lower level from which it may be increased (e.g. to increase the frequency of operation, to restart operation, etc.). The supply voltage magnitude for the powered-down state may be zero volts (ground) or any other voltage magnitude. For example, a powered-down state may comprise a low voltage that retains data in memory circuits in the integrated circuit 12 but does not permit operation of the integrated circuit 12. Powering up from the powered down state may include increasing the voltage from the lowered voltage to a voltage at which the integrated circuit 12 may operate. Powering up may also include increasing the voltage from any lowered voltage (e.g. a lower voltage at which the integrated circuit 12 may operate at a lower frequency) to a higher voltage (e.g. a voltage at which the integrated circuit 12 may operate at a higher frequency). It is noted that, in the present description, voltages may be described as higher or lower than other voltages, or greater than or less than other voltages. Ramping of voltages to certain levels may also be referred to. Such terminology may refer to the magnitudes of the voltages.

It is noted that, while the control circuit 22 generates the Ramp_Fast signal in the illustrated embodiment responsive to the Wakeup signal, other embodiments may use any other control signal for the switch 30. For example, the Wakeup signal may be used directly as the Ramp_Fast signal.

Figure 3:
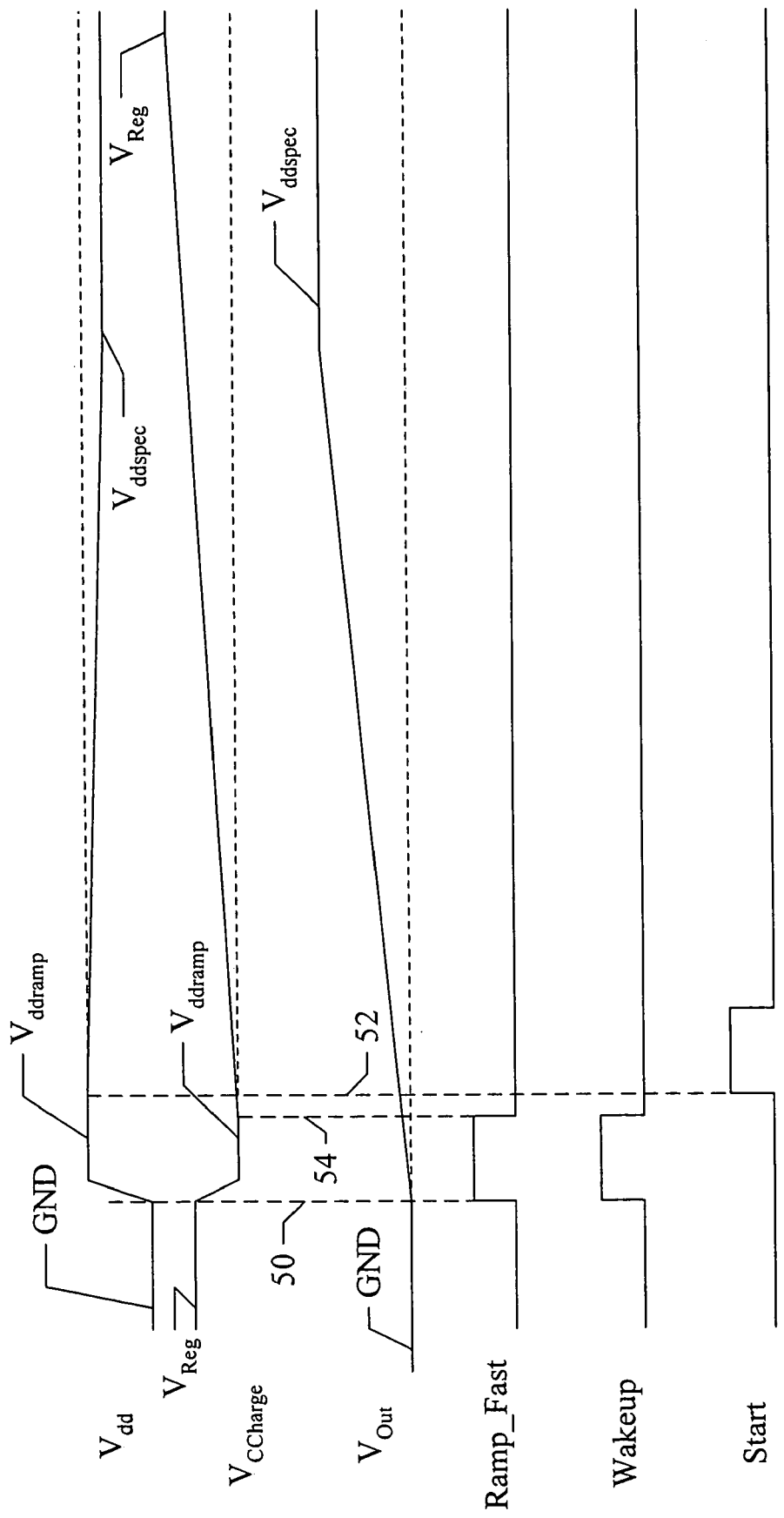
FIG. 3 is a timing diagram illustrating certain signals and voltages for one embodiment of the system shown in FIG. 1.

FIG. 3 is a timing diagram illustrating various signals and voltages shown in FIG. 1 for one embodiment. Time increases from left to right in FIG. 3, using arbitrary units. Illustrated in FIG. 3 is $V_{dd}$ (the voltage on the node 34), $V_{CCharge}$ (the voltage on the capacitor 26), and $V_{Out}$ (the voltage generated by the main regulator 18). $V_{Out}$ is shown in FIG. 3 to illustrate the ramp of the voltage generated by the main regulator 18, and thus does not illustrate the effects of other voltages on the node 34, even though $V_{Out}$ is shown as the output of the main regulator 18 to the node 34 in FIG. 1.

On the left in FIG. 3, the $V_{dd}$ voltage and $V_{Out}$ voltage are at ground (GND) and the $V_{CCharge}$ voltage is at $V_{Reg}$. The Ramp_Fast, Wakeup, and Start signals are deasserted. Subsequently, the Wakeup signal is asserted and the control circuit 22 asserts the Ramp_Fast signal in response. The $V_{dd}$ voltage rapidly ramps to the $V_{ddramp}$ voltage (and the $V_{CCharge}$ voltage drops to the $V_{ddramp}$ voltage) responsive to assertion of the Ramp_Fast signal (dotted line 50). The main regulator 18 also responds to the assertion of the Wakeup signal by ramping the $V_{out}$ voltage to $V_{ddspec}$, at a slower rate than $V_{dd}$ ramps to $V_{ddramp}$. The Wakeup signal deasserts, and the control circuit 22 deasserts the Ramp_Fast signal in response. Additionally, after a predetermined period of time from the assertion of the Ramp_Fast signal, the control circuit 22 asserts the Start signal. The period of time may be sufficient to ensure that the node 34 has ramped to the $V_{ddramp}$ voltage. Note that the Start signal is asserted prior to the time that the main regulator 18 is able to generate the $V_{out}$ voltage at the $V_{ddspec}$ level.

The $V_{dd}$ voltage begins decaying from the $V_{ddramp}$ level as the integrated circuit 12 consumes power during operation, responsive to assertion of the start signal (dotted line 52). The $V_{dd}$ voltage stabilizes at the $V_{ddspec}$ level via the operation of the main regulator 18. Additionally, the $V_{CCharge}$ voltage begins recovering from the $V_{ddramp}$ voltage to the $V_{Reg}$ voltage responsive to deassertion of the Ramp_Fast signal (dotted line 54).

Horizontal dotted lines are illustrated in FIG. 3 to help illustrates the changes in voltage magnitudes that have a shallow slope in FIG. 3. It is noted that, while $V_{Out}$ and $V_{dd}$ are initially at ground in the example of FIG. 3, in other embodiments $V_{Out}$ and $V_{dd}$ may be at any starting voltage (e.g. a lower voltage that retains memory state in the integrated circuit 12 but at which the integrated circuit 12 is not in operation).

Figure 4:
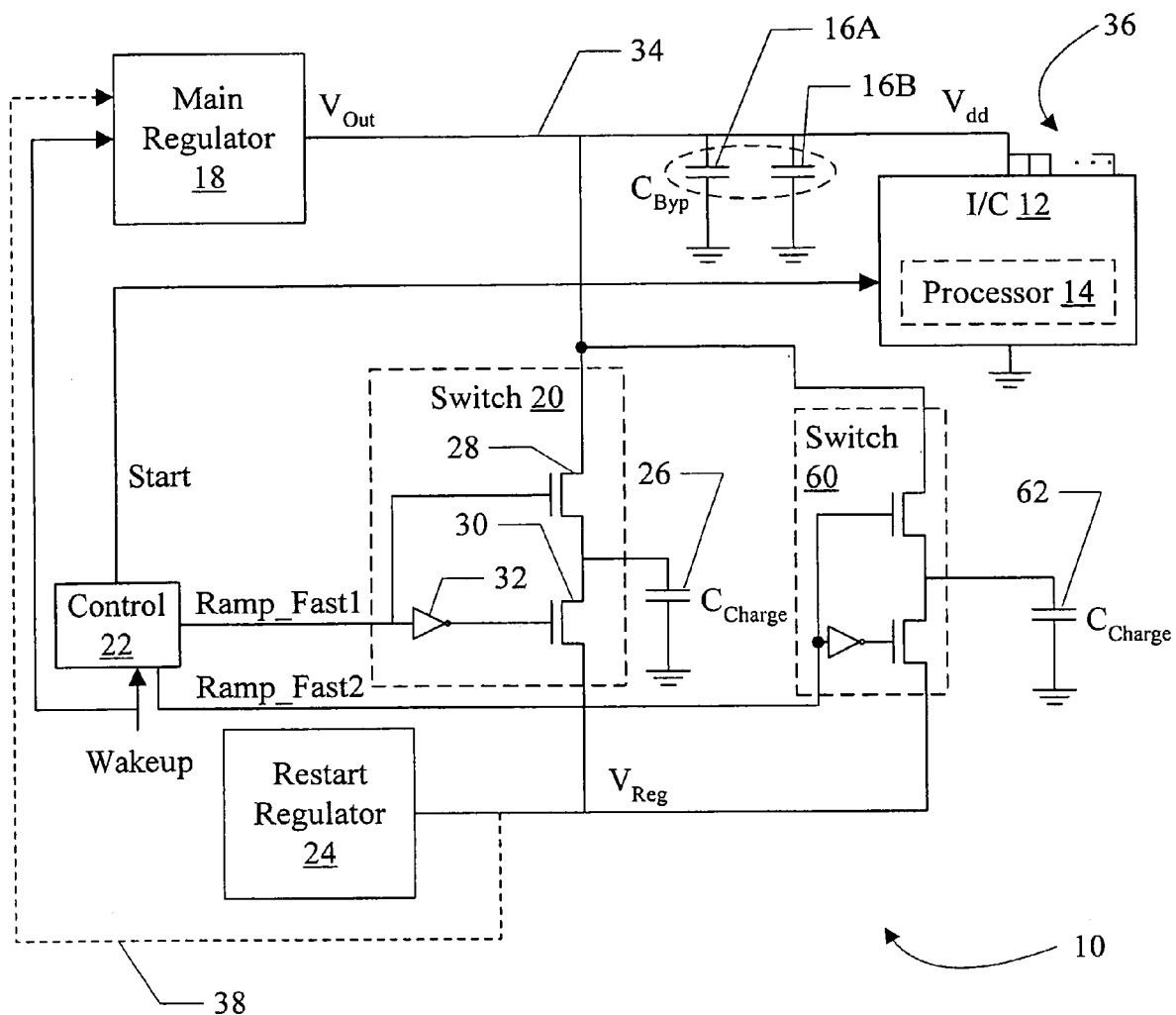
FIG. 4 is a block diagram of a second embodiment of a system including an integrated circuit and apparatus to provide a supply voltage to the integrated circuit.

Turning next to FIG. 4, a second embodiment of the system 10 is shown. The embodiment of FIG. 4 includes the components 12, 16A-16B, 18, 20, 22, 24, and 26, coupled in a similar fashion to the like-numbered components in FIG. 1. The Ramp_Fast signal to the switch 20 is labeled Ramp_Fast1 in the embodiment of FIG. 4. Additionally, a second switch 60 and a second capacitor 62 is shown coupled in parallel with the switch 20 and capacitor 26. That is, the switch 60 is coupled to the node 34 and to receive the $V_{Reg}$ voltage from the restart regulator 24. The switch 60 is coupled to the capacitor 62 and is coupled to receive a Ramp_Fast2 control signal from the control circuit 22. The capacitor 62 has a capacitance $C_{Charge}$, similar to the capacitor 26.

The switch 60 and the capacitor 62 may operate in similar fashion to the switch 20 and the capacitor 26, as described above. By providing the switch 60 and the capacitor 62, successive assertions of the Wakeup signal may be handled alternately between the switch 20/capacitor 26 and the switch 60/capacitor 62. That is, the control circuit 22 may assert the Ramp_Fast1 signal in response to a first assertion of the Wakeup signal, assert the Ramp_Fast2 signal in response to a second assertion of the Wakeup signal, assert the Ramp_Fast1 signal in response to a third assertion of the Wakeup signal, etc.

By including the switch 60 and the capacitor 62, the charge time for the capacitors 26 and 62 may be relatively long and still provide the $V_{ddramp}$ voltage even if the system 10 is "woken up" more than once within the recharge time of the capacitors, in some embodiments. While two sets of switches and capacitors are shown in FIG. 4, any number may be included in other embodiments.

The switch 60 may be similar to the switch 20. For example, in the illustrated embodiment, the switch 60 includes a pair of transistors and an inverter, similar to the transistors 28 and 30 and inverter 32 in FIG. 1.

Numerous variations and modifications will become apparent to those skilled in the art once the above disclosure is fully appreciated. It is intended that the following claims be interpreted to embrace all such variations and modifications.

What is claimed is:

1. In a system including an integrated circuit coupled to a node to receive a supply voltage and having bypass capacitors coupled in parallel with the integrated circuit to the node, an apparatus comprising:
   a first capacitor;
   a control unit configured to assert a control signal to indicate that the supply voltage to the integrated circuit is to be activated, wherein the supply voltage is deactivated in a powered-down state of the integrated circuit at a time that the control unit asserts the control signal;
   a switch coupled to the first capacitor and coupled to receive the control signal, wherein the switch is configured to electrically couple the first capacitor to the node in response to an assertion of the control signal; and
   a voltage source configured to charge the first capacitor;
   wherein the first capacitor supplies charge to the bypass capacitors when electrically coupled to the node, and wherein the switch is configured to electrically isolate the voltage source from the first capacitor responsive to the assertion of the control signal.

2. The apparatus as recited in claim 1 wherein the switch is configured to electrically couple the voltage source to the first capacitor and to electrically isolate the first capacitor from the node responsive to a deassertion of the control signal.

3. The apparatus as recited in claim 1 wherein the switch comprises a first transistor coupled between the first capacitor and the node, the first transistor having a gate coupled to receive the control signal.

4. The apparatus as recited in claim 3 wherein the switch further comprises a second transistor coupled between the voltage source and the first capacitor, the second transistor having a gate coupled to receive an inversion of the control signal.

5. The apparatus as recited in claim 1 further comprising a second switch and a second capacitor coupled in parallel with the first switch and first capacitor, wherein the second switch is controlled by a second control signal.

6. The apparatus as recited in claim 1 further comprising a voltage regulator configured to generate the supply voltage.

7. The apparatus as recited in claim 1 wherein the voltage source comprises a voltage regulator.

8. The apparatus as recited in claim 1 wherein the supply voltage magnitude is approximately zero volts with respect to ground in the powered-down state.

9. A system comprising:
   a node on which a supply voltage is provided during use;
   an integrated circuit have one or more inputs coupled to the node;
   one or more bypass capacitors coupled to the node in parallel with the integrated circuit;
   a first capacitor;
   a switch coupled to the first capacitor and coupled to receive a control signal that is asserted, during use, if the supply voltage to the integrated circuit is to be increased, wherein the switch is configured to electrically couple the first capacitor to the node in response to an assertion of the control signal;
   a voltage source configured to charge the first capacitor; and
   a voltage regulator configured to generate the supply voltage, wherein the supply voltage is inhibited in a powered-down state, wherein the voltage regulator is deactivated in the powered-down state;
   wherein the first capacitor supplies charge to the bypass capacitors when electrically coupled to the node, and wherein the switch is configured to electrically isolate the voltage source from the first capacitor responsive to the assertion of the control signal, and wherein the control signal is asserted if the supply voltage is to be increased from the powered-down state.

10. The system as recited in claim 9 wherein the switch is configured to electrically couple the voltage source to the first capacitor and to electrically isolate the first capacitor from the node responsive to a deassertion of the control signal.

11. The system as recited in claim 9 wherein the switch comprises a first transistor coupled between the first capacitor and the node, the first transistor having a gate coupled to receive the control signal.

12. The system as recited in claim 11 wherein the switch further comprises a second transistor coupled between the voltage source and the first capacitor, the second transistor having a gate coupled to receive an inversion of the control signal.

13. The system as recited in claim 9 further comprising a second switch and a second capacitor coupled in parallel with the first switch and first capacitor, wherein the second switch is coupled to receive a second control signal.

14. The system as recited in claim 9 wherein the voltage source comprises a second voltage regulator.

15. The system as recited in claim 9 wherein the integrated circuit comprises at least one processor.

16. A method comprising:
   detecting that a supply voltage to an integrated circuit is to be increased from a powered-down state of the integrated circuit in which the supply voltage is deactivated;
   asserting a signal responsive to the detecting;
   electrically coupling a first capacitor to a supply voltage node to the integrated circuit responsive to the asserting, wherein one or more bypass capacitors are also coupled to the power supply node in parallel with the integrated circuit, and wherein the capacitor provides charge to the bypass capacitors; and
   electrically isolating the first capacitor from a voltage source that charges the first capacitor responsive to the asserting.

17. The method as recited in claim 16 further comprising charging the first capacitor during a time period that the supply voltage on the supply voltage node is being provided by a voltage regulator.

18. The method as recited in claim 16 further comprising:
   deasserting the signal;
   electrically isolating the capacitor from the supply voltage node responsive to the deasserting; and
   electrically coupling the first capacitor to the voltage source responsive to the deasserting.

19. The method as recited in claim 16 further comprising:
disabling a main voltage regulator in a system with the integrated circuit, wherein the supply voltage is reduced to ground responsive to the disabling;
retaining a charge on the first capacitor during a time period that the main voltage regulator is disabled; and
wherein the detecting that the supply voltage is to be increased comprises detecting that the main voltage regulator is to be enabled.

20. The method as recited in claim 19 further comprising keeping a restart voltage regulator enabled during the time period that the main voltage regular is disabled, wherein the restart regulator is coupled to the first capacitor during the time period to retain the charge.

* * * * *